United States Patent

[11] 3,633,030

[72] Inventors: Stephen Antkiw, Ridgefield; Jay Tittman, Danbury, both of Conn.
[21] Appl. No.: 823,899
[22] Filed: May 12, 1969
[45] Patented: Jan. 4, 1972
[73] Assignee: Schlumberger Technology Corporation, New York, N.Y.

[54] SEMICONDUCTOR DETECTOR BOREHOLE LOGGING TECHNIQUE
9 Claims, 4 Drawing Figs.
[52] U.S. Cl. .................................................. 250/71.5 R, 252/83.3 R, 252/83.6 W
[51] Int. Cl. .................................................. G01v 5/00, G01t 1/20, G01t 1/24
[50] Field of Search .................................................. 250/83.3, 83.6 W, 71.5

[56] References Cited
UNITED STATES PATENTS
2,760,078  8/1956  Youmans .................... 250/83.3
3,312,823  4/1967  Bonner et al. ............. 250/83.6 W X Primary Examiner—Archie R. Borchelt
Attorneys—William R. Sherman, Donald H. Fidler, Stewart F. Moore and John P. Sinnott ABSTRACT: One embodiment of the invention provides an array of semiconductor radiation detectors for coincidence or anticoincidence counting in a borehole logging tool. A further refinement combines, in a logging tool, a semiconductor spectrometer with one or more scintillation detectors. The response of this latter arrangement corresponds to the fine spectral resolution that characterizes semiconductor detectors rather than the less sharply defined spectral resolution of scintillation devices.

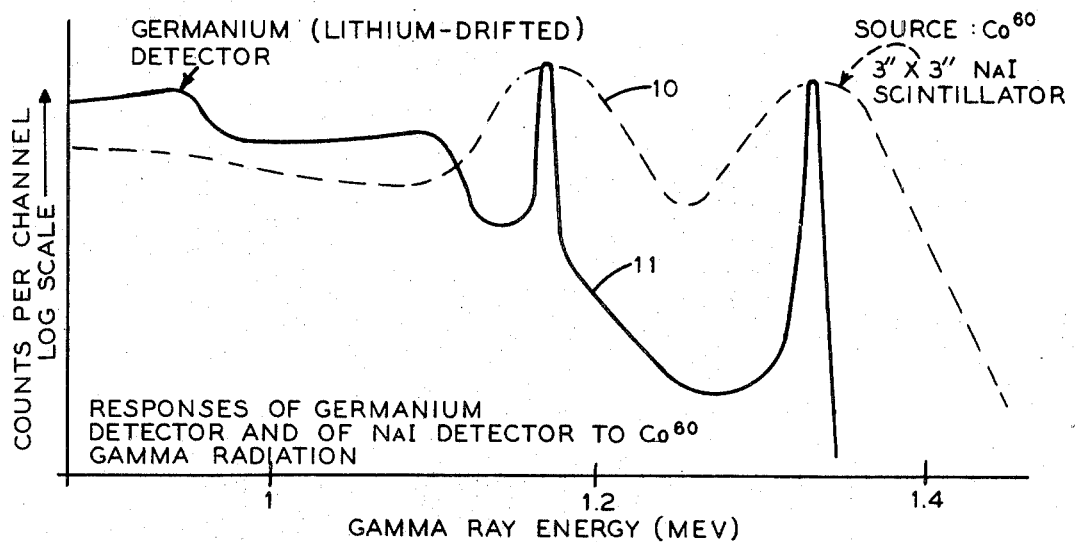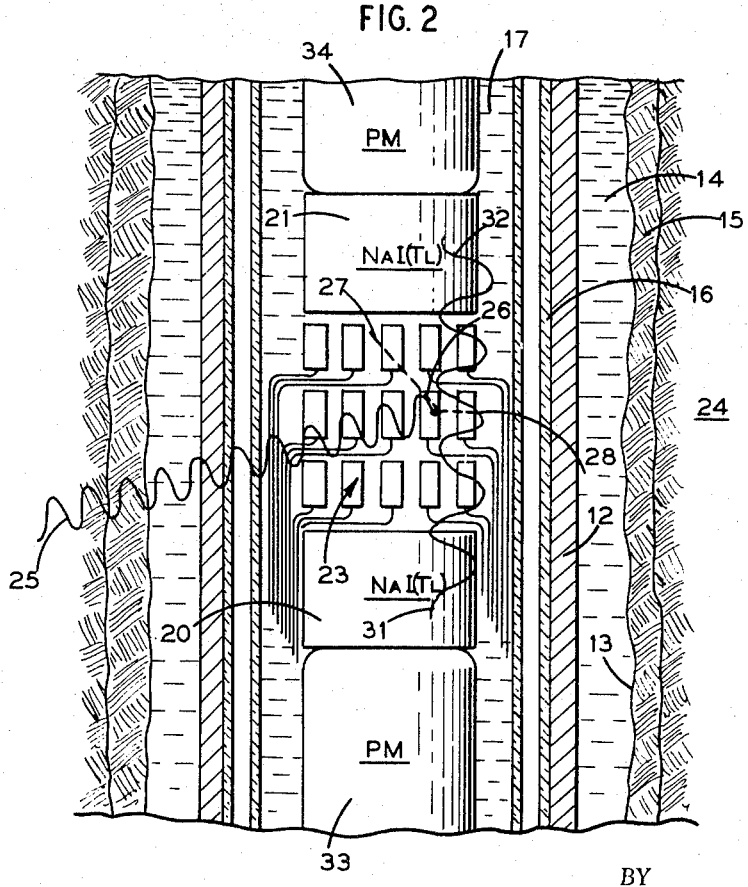

SEMICONDUCTOR DETECTOR BOREHOLE LOGGING TECHNIQUE

BACKGROUND OF THE INVENTION

1. Field of the Invention

This invention relates to methods and apparatus for logging boreholes, and more particularly, to an improved radiation spectrometer for use in well logging tools, and the like.

2. Description of the Prior Art

Oil-bearing zones can be identified more readily if the chemical composition of the earth formations surrounding a borehole are known. For example, if a sandstone or a limestone formation is known to be under observation, other data, such as formation porosity, can be interpreted with greater meaning by geologists and petroleum engineers.

The mineral structure of the earth formation under investigation, however, often is not known. Accordingly, for instance, suggestions have been advanced for identifying formation elements through thermal neutron capture gamma rays. One proposed technique of this sort involves bombarding a formation with neutrons. The irradiating neutrons interact with formation nuclei and produce gamma rays. These gamma rays have intensity maxima at specific energies ("monoenergetic gammas") that are unique to each element.

An examination of a spectrum of the capture gamma rays emitted by an irradiated formation enables some of the elements present in the formation to be identified through their characteristic intensity maxima. The influence of other physical phenomena and the imprecise energy resolution of scintillation detectors, however, frequently prevents these intensity maxima from being identified without the assistance of a sophisticated mathematical treatment.

These scintillation detectors usually comprise a crystal of thallium-activated sodium iodide [NaI(Tl)] that responds to an incident quantum of gamma radiation by emitting a flash of light. The intensity of the light flash is proportional to the energy deposited in the scintillation crystal by the incident gamma ray. A photomultiplier tube, optically coupled to the crystal, responds to the light flash by emitting a current of electrons ("photoelectrons") that corresponds to the intensity of the flash. An electrode or dynode structure within the tube reacts to these photoelectrons by producing an amplified output signal that also is proportional to the initial current of photoelectrons, and hence, the energy of the detected quantum of gamma radiation.

The energy resolution of these scintillation counters ordinarily is greater than 7 percent at 0.6 mev. due to electron emission characteristics of the photomultiplier tube and variations in the amount of light reaching the tube. The term "energy resolution" usually is defined as the inverse ratio of the photomultiplier output pulse amplitude to the root mean square deviation in the pulse amplitude. Consequently, monoenergetic gamma rays observed by scintillation counters are not identified by sharp intensity peaks at specific energies, but appear rather as broad humps that might be mistaken for other gamma ray intensity maxima, or even conceal these other maxima.

Higher energy gamma rays, moreover, are reduced in energy by interacting with the electrons in the atomic structure of the crystal. This phenomenon, known as the "Compton effect," produces a continuum of lower energy gamma radiation ("Compton tails") in the spectrometer.

Pair production events also tend to increase the spectrum complexity. Typically, this phenomenon is characterized by gamma rays that have energies of about 1.02 mev. or more. These gamma rays enter a crystal and produce flashes of light and pairs of electrons and positrons (a positron has the mass of an electron and a positive charge). The positron is annihilated by combining with another electron and producing two oppositely directed 0.51 mev. gamma rays which also interact with the crystal.

If several monoenergetic gamma ray sources are present, spectral quality is impaired even further, largely as a consequence of scintillation crystal characteristics. Thus, for example, the Compton tail continuum characterizing crystal response to higher energy gamma rays often is superimposed on lower energy gamma rays emitted from other elements. These Compton tails tend to mask or obliterate these lower energy characteristic monoenergetic gamma ray intensity maxima.

Three-crystal coincidence and anticoincidence spectrometers have been suggested to overcome these problems. In these spectrometers, three scintillator crystals are aligned in a row, each crystal being coupled optically to a respective photomultiplier tube. For coincidence operation, signals from the center crystal are gated to a pulse height analyzer circuit only if approximately simultaneous events are detected in the two end crystals. Anticoincidence operation, however, blocks the center crystal signal in response to simultaneously occurring scintillations in the end crystals.

Although the spectrally degrading Compton tail effect is reduced through three-crystal spectrometry, the relatively poor resolution of scintillation detectors remains a problem. Moreover, the physical arrangement of three crystals and their respective photomultiplier tubes is not adaptable to the small diameter of most well logging tools unless specially shaped crystals and photomultiplier tubes are used.

Therefore, it is an object of this invention to provide a radiation detector for a borehole logging tool that has an improved energy resolution.

It is another object of the invention to improve radiation spectrometer resolution.

It is a further object of the invention to provide three-detector coincidence and anticoincidence spectrometers that can be accommodated in a borehole logging tool.

SUMMARY

In accordance with the invention, a well logging tool is provided with one or more semiconductor radiation detectors used in combination with a scintillation counter arrangement for coincidence or anticoincidence spectroscopy.

More particularly, the spectral resolution of semiconductor detectors, such as lithium-drifted germanium devices, is about 0.1 percent. Thus, if semiconductor detectors are connected for coincidence or anticoincidence spectroscopy, the unsatisfactory resolution characteristics of scintillator detectors are overcome.

In one embodiment of the invention, one or more scintillation detectors may be combined with at least one semiconductor detector. By applying the scintillation detector signals to a gating circuit in order to pass or inhibit the signal from the semiconductor detector, a coincidence or anticoincidence spectrum is produced that has the precise energy resolution of the semiconductor spectrometer, and not the unsatisfactory response of the scintillator detector.

The combination of scintillator and semiconductor detectors especially is valuable in connection with borehole logging tools. In this regard, a triple coincidence (or anticoincidence) counter comprising a semiconductor detector interposed between two scintillation crystals can be packaged neatly within the housing of a logging tool and thereby avoids the need for special crystal shapes which has characterized the prior art. Thus, the advantages of the large active volumes obtainable with scintillator crystals are combined with the energy resolution features of semiconductor detectors to produce a superior borehole spectrometer.

Because semiconductor detectors are temperature sensitive (germanium devices usually operate at the temperature of liquid nitrogen), a further aspect of the invention provides thermal control means within the logging tool for maintaining these detectors at the correct temperature for satisfactory operation.

With these and other objects in mind, the features and advantages of the present invention will be understood best from the following description when read in conjunction with the accompanying drawings. It will be understood that the description and accompanying drawings are for the purposes of illustrating a preferred embodiment and not to be construed as defining the scope or limits of the invention, reference being had for the latter purpose to the appended claims.

BRIEF DESCRIPTION OF THE DRAWING

FIG. 1 compares an energy spectrum of the intensity of the gamma radiation emitted from a Cobalt 60 (Co⁶⁰) source detected by a scintillator spectrometer with the spectrum from the same source observed with a semiconductor detector;

FIG. 2 is a schematic diagram of one embodiment of the invention;

DESCRIPTION OF THE PREFERRED EMBODIMENTS

Figure 3:
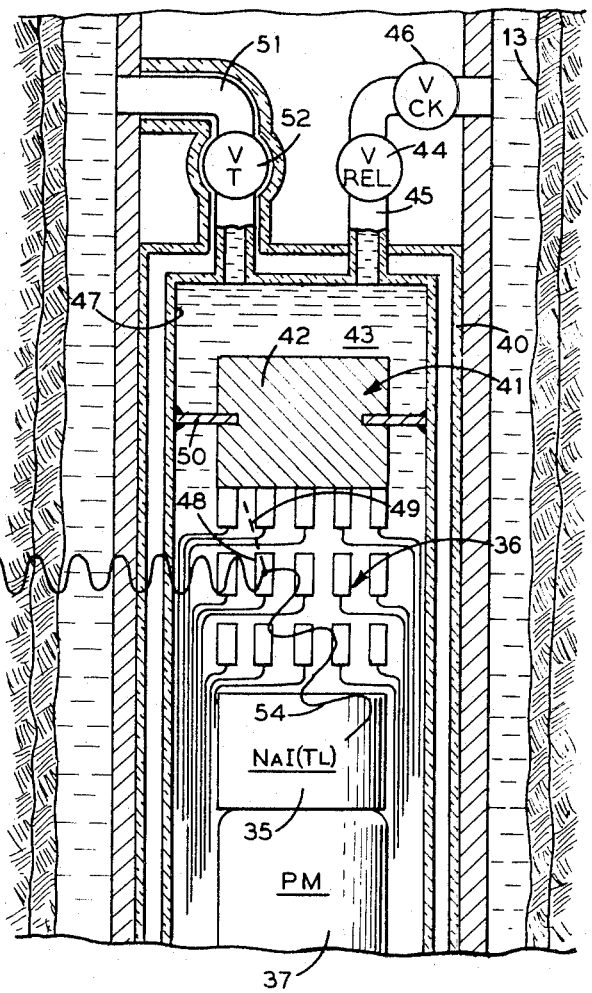
FIG. 3 is a schematic diagram of another embodiment of the invention.

For a more complete understanding of the principles and advantages of the present invention, FIG. 1 shows a representative graph that contrasts the gamma radiation intensity spectrum 10, of a Co⁶⁰ source observed with the aid of a single conventional NaI(Tl) scintillation detector, and the spectrum 11 from the same source as observed with a single lithium-drifted germanium semiconductor radiation detector. The well-defined gamma ray intensity peaks at 1.17 mev. and 1.33 mev., that are so prominent in the spectrum 11, clearly identify Co⁶⁰ as the radioactive source. The spectrum 10 provided by the NaI(Tl) scintillator, however, lacks these obvious intensity maxima, and provides instead two humps that extend from about 1.13 mev. to 1.25 mev. and from about 1.25 mev. to 1.4 mev. The failure of the scintillator detector spectrum 10 to show specific intensity maxima interferes with Co⁶⁰ being identified definitely as the source of the observed radiation. This energy resolution problem is aggravated even further if neutron-induced gamma radiation emanating from an earth formation surrounding a borehole is observed. In this latter situation, radiation spectra from several isotopes are superimposed to produce a complex spectrum in which the individual component spectra are almost indistinguishable.

Semiconductor detectors overcome this unsatisfactory spectral definition and achieve excellent energy resolution partly because much less energy is needed to produce a "count," or signal, in response to incident radiation than that which is required by scintillation detectors.

In operation, a conventional junction-type semiconductor detector usually is "reverse biased" to cause charge carriers to move away from the junction and produce a mobile carrier "depletion layer." Radiation, such as gamma rays, if absorbed in the depletion layer may increase the electron density on one side of the junction by knocking an electron out of the detector's atomic structure. Because the freed electron forms an electron-hole pair, the equilibrium potential difference across the junction must decrease to prevent current from flowing. Accordingly, automatic decrease in reverse bias voltage across the junction produces an open circuit voltage, $V_{oc}$. It can be shown that:

$$V_{oo} = \left(\frac{kT}{e}\right) \ln\left(1 + \frac{g}{g_t}\right)$$

where $k$ is Boltzmann's constant; $T$ is the absolute temperature in degrees Kelvin; $e$ is the charge on the electron; $g$ is the rate of electron-hole pair formation in pairs/cc./sec.; and $g_t$ is the rate of electron-hole pair formation in pairs/cc./sec. for normal thermal generation.

The foregoing equation shows that semiconductor detectors are sensitive to heat as well as to incident radiation This temperature sensitivity is so critical that, as hereinbefore mentioned, germanium semiconductor detectors usually require liquid nitrogen for a coolant. Silicon devices are not so extremely temperature sensitive and do not need the careful thermal control that germanium devices require. Silicon detectors, however, are less radiation sensitive than germanium devices.

Moreover, the active volume of an ordinary semiconductor detector often is small for practical well logging applications. This volume can be increased by connecting several detectors together in parallel in a two- or three-dimension array in order to produce sufficient counts for an acceptable radiation signal in a borehole environment.

In accordance with the invention, FIG. 2 shows one embodiment of a high resolution semiconductor triple-coincidence spectrometer in a well logging tool. The spectrometer is enclosed in a pressure-resistant well logging tool housing 12 for transport through a borehole 13. Typically, the borehole 13 is filled with drilling fluid 14 and lined with a mudcake 15.

The spectrometer temperature is controlled by a Dewar flask 16 within the housing 12. The flask 16, formed of a material that has a low thermal conductivity, has inner and outer walls in axial alignment with the housing 12 that are separated from each other by a vacuum to reduce heat flow into the spectrometer from the borehole 13 or electrical equipment (not shown) in the housing 12. The flask 16 is filled with liquid nitrogen 17 to maintain the spectrometer at the correct temperature for semiconductor detector operation.

A pair of NaI(Tl) scintillator crystals 20 and 21 are axially separated by a two-dimension array of semiconductor detectors 23, which may be lithium-drifted germanium devices. All of the semiconductor detectors are connected electrically in parallel in order to compensate at least in part for the small active volume of each individual detector, as hereinbefore described. If, however, detector volume is sufficiently greaT or the radiation in the borehole 13 is particularly intense, a single semiconductor detector interposed between the crystals 20 and 21 will provide an acceptable signal.

In operation, the radiation emanating from the formation 24 may be the natural radioactivity of the formation 24. Usually, however, neutrons or gamma rays emitted from a source (not shown) within the housing 12 interact with the formation 24. Radiation, such as the gamma ray 25, result from these interactions and arrive at the spectrometer with information regarding the nature of the formation 24.

For the purposes of illustration, the detection of a pair production event will be described in connection with the apparatus of FIG. 2. The invention, however, is not limited to the detection only a pair production events, inasmuch as the spectrometer is adaptable to the detection of any nuclear phenomena that characterizes the formations surrounding a borehole.

The gamma ray 25, which must have an energy of at least 1.02 mev., generates electron-hole pairs in a semiconductor detector 26 in the array 23. The current pulse thus produced in a semiconductor detector 26 is in proportion to the energy of the incident gamma ray 25. An interaction, moreover, between the gamma ray 25 and the atomic structure of the semiconductor 26 produces an electron 27 and a positron 28 (shown diagrammatically in FIG. 2). The electron 27 preferably expends its energy within the crystal, producing a light quanta output that is proportional to its initial energy. The positron 28, however, after losing its initial energy, combines with a free electron to produce two oppositely directed 0.51 mev. gamma rays 31 and 32. The gamma ray 31 causes a flash of light within the scintillator crystal 20, and the gamma ray 32 produces another flash of light in the crystal 21. Photomultiplier tubes 33 and 34, respectively, respond to these light flashes to produce charge pulses that are almost simultaneous with the signal from the array of semiconductors 23.

Accordingly, the high resolution signal from the semiconductor detector 26 can be gated to a recorder by the approximately coincident signals from the photomultiplier tubes 33 and 34, as described subsequently in more complete detail. In this manner, two scintillator detectors and a semiconductor detector 26 combine to produce a triple-coincidence output signal that has the high quality of the semiconductor detector, because pulses from the tubes 33 and 34 are used only as gating signals rather than for their radiation energy information. The entire spectrometer fits neatly within the housing 12 and does not impose any requirement for specially shaped crystals, and the like.

A further embodiment of the invention, arranged for two-coincidence detection, is shown in FIG. 3. A scintillator crystal 35 is positioned below a two-dimensional array of semiconductor detectors 36 in a logging tool. The detectors 36, the crystal 35, and a photomultiplier tube 37 optically coupled to the crystal are encapsulated in a Dewar flask 40.

The temperature of the semiconductor detector 36 is controlled by a "cold finger" thermal conductor 41 which comprises a block 42 of thermally conductive material for use in very low-temperature environments, such as copper or silver. The block 42 is in physical contact with the array of semiconductor detectors 36. The block 42 absorbs heat from the detectors and transfers the heat to a low-temperature bath 43 of liquid nitrogen, or the like, within the Dewar flask 40.

Typically, the liquid nitrogen bath 43 comprises a reservoir 47 formed within the Dewar flask 40 by an annular dike 50 that is soldered to the inner wall of the flask and rigidly engages the periphery of the copper block 42.

The heat from the block 42 accumulates in the liquid nitrogen bath 43 and causes the liquid nitrogen to boil. At a predetermined pressure commensurate with the structural integrity of the Dewar flask 40, a pressure relief valve 44 in a discharge conduit 45 opens automatically. The nitrogen gas which accumulated under pressure within the bath 43 flows through the conduit 45 and operates a check valve 46. The pressure relief valve 44 and the check valve 46 establish one-way communication between the bath 43 and the borehole 13 through the conduit 45 to enable the nitrogen gas to discharge into the borehole and relieve the pressure within the Dewar flask 40. The substantially constant pressure within the bath 43, moreover, stabilizes the heat balance within the Dewar flask 40. Other cooling techniques can, of course, be used in connection with the invention. Dry ice, for instance, when used with silicon base detectors, may in many situations provide a satisfactory cooling medium.

In operation, the reservoir 47 is filled with liquid nitrogen through a double walled passage 51. Thus, when the tool is on the earth's surface the passage 51 is thoroughly purged and a throttle valve 52 is opened to enable liquid nitrogen to flow from an external supply into the reservoir 47. The throttle valve 52 is closed and the sonde is lowered into the borehole 13 to some predetermined depth.

As the sonde is drawn upward through the borehole 13 by a cable (not shown), the spectrometer registers radioactivity emanating from the formation 24. The spectrometer shown in FIG. 3 can be used if, for example, gamma rays that lose energy through the aforementioned Compton effect are to be considered. Accordingly, as shown schematically in FIG. 3, a gamma ray 53 from the earth formation 24 is incident on an electron 49 in an orbit of an atom in a semiconductor detector 48 in the detector array 36. The electron 49 is ejected from the orbital path. The gamma ray 53 suffers a loss in energy and produces a lower energy scattered gamma ray 54. The scattered gamma ray 54 causes a flash of light in the crystal 35 that results in a charge pulse at the output electrodes of the photomultiplier tube 37. Electron-hole pair formation by the incident gamma ray 53 provides an energy dependent signal from the detector array 36.

The pulse from the tube 37 can be applied to gate the signal from the semiconductor detector 48 to a recording device (not shown) in order to establish a count of Compton events. Alternatively, Compton events may be discriminated and filtered out by applying the photomultiplier tube pulse to disable a gate and thereby prevent the recording of a substantially simultaneous signal in the semiconductor detector array 36.

Figure 4:
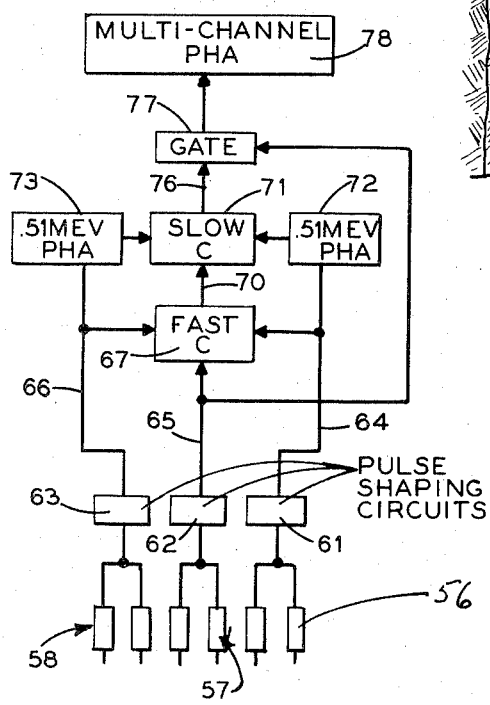
FIG. 4 is a schematic diagram of an embodiment of the invention showing the electrical circuits associated therewith in block diagram form.

A further embodiment of the invention for use in observing pair production is shown schematically in FIG. 4. Three arrays of semiconductor detectors 56, 57 and 58, in which the detectors in each array are connected in parallel, are used in this embodiment of the borehole logging tool. A signal emitted by the center detector array 57 in response to incident radiation is recorded only if an annihilation quantum of gamma ray energy is recorded in each of the two adjoining arrays of semiconductor detectors 56 and 58. Signals from the semiconductor detector arrays 56, 57 and 58 are transmitted through respective pulse-shaping circuits 61, 62 and 63. Typical pulse-shaping circuits, such as pulse charge preamplifiers, amplifiers and the like, suitable for application within the housing of a well logging tool are described in "Improved Detectors and Circuits Spur Nuclear-Particle Research" by Margaret Beach Glos, *Nucleonics*, Vol. 24, No. 5, pp. 44–51 (May 1966) and "IEEE Transactions on Nuclear Science" (June 1966), Institute of Electrical and Electronics Engineers, Inc., New York, N.Y. Of course, all, or only a portion of the electrical circuits shown in FIG. 4 may be placed within the sonde housing (not shown), while the balance of the circuits can be located on the earth's surface.

The pulse-shaping circuit output signals are transmitted through conductors 64, 65 and 66. Signals from the central semiconductor detector array 57 in the conductor 65 are gated through a fast coincidence circuit 67 by the substantially simultaneous arrival at the circuit 67 of signals from the semiconductor detector arrays 56 and 58 on leads 64 and 66, respectively. The output signal from the fast coincidence circuit 67 is sent through a conductor 70 to a slow coincidence circuit 71.

Because, when pair production events are observed, the positron annihilation gamma rays have energies of 0.51 mev., pulse height analyzers 72 and 73 are set to respond only to signals from the semiconductor detector arrays 56 and 58 that correspond to gamma rays of about 0.51 mev. The approximately simultaneous arrival of signals from the fast coincidence circuit 67 and the positron annihilation gating pulses from analyzers 72 and 73 enable the slow coincidence circuit 71 to emit a gating pulse. The gating pulse from the slow coincidence circuit 71 is sent through a conductor 76 to enable a gate 77. The enabled gate 77 sends a signal in the conductor 65 from the semiconductor array 57 to a multichannel pulse height analyzer 78.

The pulse height analyzer 78 stores the intensity of the gamma radiations in discrete energy ranges of, for example, 0.15 kev. energy increments. A recorder (not shown) can be connected to the pulse height analyzer 78 to display graphically the information stored in the analyzer 78 and thereby produce an energy spectrum of pair-producing gamma radiation intensities characteristic of the earth formation surrounding the borehole.

Alternatively, if the gate 77 is disabled by the coincidence-indicating pulse from the slow coincidence circuit 71, the signal from the detector array 57 will not be gated through to the analyzer 78. This latter arrangement provides an anticoincidence circuit that will discriminate against pair-production events.

It will be obvious to those skilled in the art that various changes and modifications may be made therein without departing from the invention, and it is therefore intended to cover all such changes and modifications as fall within the true spirit and scope of the invention.

What is claimed is:

1. A tool for logging radiation emanating from an earth formation surrounding a borehole comprising a housing, a semiconductor detector within said housing to form electron-hole pairs in response to the earth formation radiation, circuit means coupled to said semiconductor detector for producing a signal that corresponds to said electron-hole pairs, another semiconductor detector within said housing to form electron-hole pairs in response to radiation that is substantially coincident in time with said other detector electron-hole pair forming radiation, and gating means coupled to said another semiconductor detector for controlling said circuit means signal in response to said substantially coincident radiation.

2. A tool for logging radiation emanating from an earth formation surrounding a borehole comprising a housing, a semiconductor detector within said housing to form electron-hole pairs in response to the earth formation radiation, circuit means coupled to said semiconductor detector for producing a signal that corresponds to said electron-hole pairs, another semiconductor detector within said housing to form electron-hole pairs in response to radiation that is substantially coincident in time with said other detector electron-hole pair forming radiation, temperature control means for removing heat from said semiconductor detectors to enable said detectors to form electron-hole pairs substantially in response only to the earth formation radiation, and gating means coupled to said another semiconductor detector for controlling said circuit means signal in response to said substantially coincident radiation.

3. A tool for logging radiation emanating from an earth formation surrounding a borehole comprising a housing for transport through the borehole, a plurality of semiconductor detector devices within said housing to form electron-hole pairs in response to the earth formation radiation, circuit means coupled to at least one of said plurality of semiconductor detectors for producing a signal that corresponds to said one detector electron-hole pairs, and gating means coupled to the balance of said semiconductor devices in said plurality to enable said circuit means to emit said signal in response to radiation that is substantially coincident with the electron-hole pairs forming radiation in said circuit-coupled semiconductor detector.

4. A tool for logging radiation emanating from an earth formation surrounding a borehole, comprising a plurality of semiconductor detectors within said housing to form electron-hole pairs in response to the earth formation radiation, circuit means coupled to at least one of said plurality of semiconductor detectors for producing a signal that corresponds to said one detector electron-hole pairs, and gating means coupled to the balance of said semiconductor detectors in said plurality to inhibit said circuit means signal in response to radiation that is substantially coincident in time with the electron-hole pairs forming radiation in said circuit-coupled semiconductor detector.

5. A tool for logging radiation emanating from an earth formation surrounding a borehole comprising at least one semiconductor detector within said housing to form electron-hole pairs in response to the earth formation radiation, at least one scintillation detector within said housing for producing a signal that corresponds to the earth formation radiation, circuit means coupled to said semiconductor detector for producing a signal that corresponds to said electron-hole pairs, and gating means coupled to said scintillation detector for emitting said circuit means signal in response to radiation that is substantially coincident with the electron-hole pair forming radiation.

6. A tool for logging radiation emanating from an earth formation surrounding a borehole, at least one semiconductor detector within said housing to form electron-hole pairs in response to the earth formation radiation, at least one scintillation detector within said housing for producing a signal that corresponds to the earth formation radiation, circuit means coupled to said semiconductor detector for producing a signal that corresponds to said electron-hole pairs, and gating means responsive to said scintillation detector signal to inhibit said circuit means signal in response to radiation that is substantially coincident with the electron-hole pair forming radiation in said circuit-coupled semiconductor detector.

7. A tool for logging radiation emanating from an earth formation surrounding a borehole comprising at least one semiconductor detector within said housing to form electron-hole pairs in response to the earth formation radiation, two scintillator crystals each adjacent a respective end of said semiconductor detector and in approximate alignment therewith, light-responsive means optically coupled to said crystals for producing a signal in response to radiation-induced illumination therein, circuit means coupled to said semiconductor detector for producing a signal that corresponds to said electron-hole pairs, and gating means responsive to said light-responsive means signal for controlling said circuit means signal.

8. A tool for logging radiation emanating from an earth formation surrounding a borehole comprising at least one semiconductor detector within said housing to form electron-hole pairs in response to the earth formation radiation, two scintillator crystals each adjacent a respective end of said semiconductor detector and in approximate alignment therewith, light-responsive means optically coupled to said crystals for producing a signal in response to radiation-induced illumination therein, circuit means coupled to said semiconductor detector for producing a signal that corresponds to said electron-hole pairs, and gating means activated by said light-responsive signal to emit said circuit means signal when said radiation-induced illumination is substantially coincident with the electron-hole pair forming radiation.

9. A tool for logging radiation emanating from an earth formation surrounding a borehole comprising at least one semiconductor detector within said housing to form electron-hole pairs in response to the earth formation radiation, two scintillator crystals each adjacent a respective end of said semiconductor detector and in approximate alignment therewith, light-responsive means optically coupled to said crystals for producing a signal in response to radiation-induced illumination therein, circuit means coupled to said semiconductor detector for producing a signal that corresponds to said electron-hole pairs, and gating means activated by said light-responsive signal to inhibit said circuit means signal when said radiation-induced illumination is substantially coincident in time with the electron-hole pair forming radiation.

* * * * *